United States Patent [19]

Ozaki et al.

[11] Patent Number: 5,021,884
[45] Date of Patent: Jun. 4, 1991

[54] NOISE REDUCER CIRCUIT FOR VIDEO SIGNAL

[75] Inventors: Hidetoshi Ozaki; Akira Gokura, both of Tokyo, Japan

[73] Assignee: Victor Company of Japan, Ltd., Yokohama, Japan

[21] Appl. No.: 493,711

[22] Filed: Mar. 15, 1990

[30] Foreign Application Priority Data

Mar. 15, 1989 [JP] Japan .................................. 1-62573

[51] Int. Cl.$^5$ ............................................ H04N 5/21
[52] U.S. Cl. ...................................... 358/167; 358/340; 358/336
[58] Field of Search ................ 358/167, 166, 36, 340, 358/336, 327

[56] References Cited

U.S. PATENT DOCUMENTS

| 4,549,037 | 10/1985 | Bayer | 358/167 |
| 4,698,696 | 10/1987 | Matsuo | 358/340 |
| 4,750,037 | 6/1988 | Kido | 358/167 |
| 4,796,088 | 1/1989 | Nishimura | 358/166 |
| 4,864,404 | 9/1989 | Matsuo | 358/340 |
| 4,961,113 | 10/1990 | Okada | 358/167 |
| 4,962,434 | 10/1990 | Matsuo | 358/340 |

Primary Examiner—Tommy P. Chin
Attorney, Agent, or Firm—Cushman, Darby & Cushman

[57] ABSTRACT

In a video signal noise reducer circuit, an output video signal is delayed in a frame memory, then substracted from an input video signal, and the resultant difference signal then passed through a high pass filter. The difference signal and the filter output signal are then compared, and the one of these signals currently having the smaller absolute amplitude is modified by an amplitude-dependent feedback factor and then subtracted from the input video signal to obtain the output video signal.

5 Claims, 5 Drawing Sheets

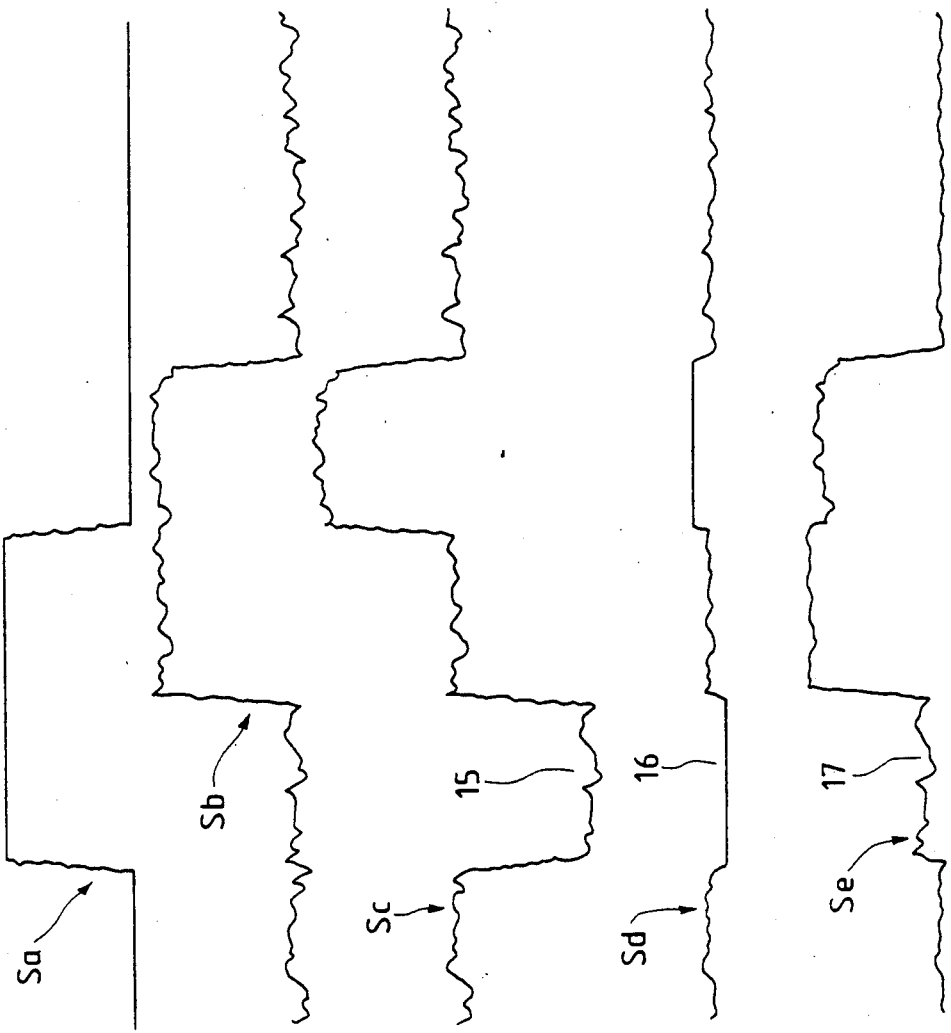

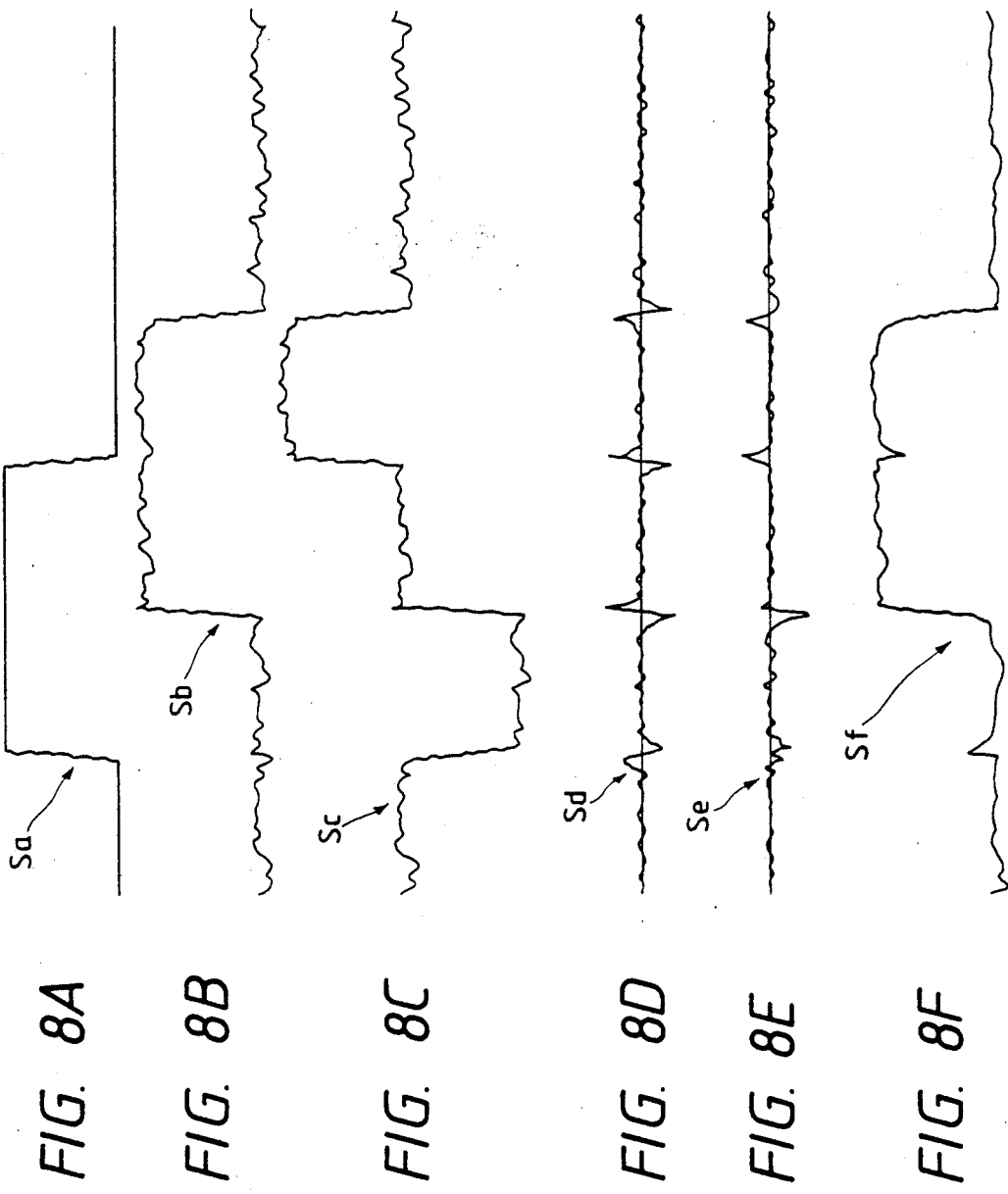

NOISE REDUCER CIRCUIT FOR VIDEO SIGNAL

BACKGROUND OF THE INVENTION

1. Field of Application

The present invention relates to a video signal noise reducer circuit.

2. Prior Art Technology

Noise reducer circuits are known in the prior art, for reducing the level of noise contained in a video signal, to thereby achieve improved quality of a display image obtained from that video signal. With one type of such prior art video signal noise reducer circuit, the video signal is written into a frame memory, and the average of N frames of the video signal is obtained (where N is a fixed integer). For each portion of a frame (e.g. each portion corresponding to a picture element), if there is no change from the corresponding average value (i.e. there is correlation), then that frame is transferred unchanged by the noise reducer circuit. However if there is a lack of correlation, indicating the presence of noise, then the noise power is attenuated by a factor 1/N. That is to say, the noise amplitude is attenuated by the factor $1/\sqrt{N}$. It is possible to use a frame memory for this purpose which is capable of storing a plurality of frames, as a non-feedback type of noise reducer circuit. However that is expensive, and an alternative is to use a feedback type of noise reducer circuit which employs a frame memory capable of storing a maximum of one frame of the video signal. This has the advantage that such a noise reducer circuit can be configured using only adders and subtractors, without multipliers being required, so that the overall circuit can be simple.

The term "frame memory" as used in the following description should be understood as being equally applicable to a 1-field memory in which successive fields of a video signal are stored (e.g. in the case of a video signal having one field per frame) and a memory in which successive frames of a video signal are stored (e.g. in the case of an interlace type of video signal having two fields per frame). It should also be noted that the descriptions of the prior art and of embodiments of the invention are directed towards processing of an input video signal which has previously been converted to digital form, i.e. consists of successive digital sample values. However for ease of understanding, the operation of the prior art examples and the subsequent embodiments of the present invention will be described based on examples analog signal waveforms.

FIG. 1 is a block diagram of a first example of a prior art feedback type of noise reducer circuit, and FIGS. 5A to 5E show examples of signal waveforms at various points within that circuit. Numeral 1 denotes a video signal input terminal, numeral 2 a video signal output terminal, 3 and 4 are subtractors, 7 denotes a feedback factor circuit, and 8 denotes a memory which can hold a fixed-duration portion of the video signal. This will be assumed to be a 1-frame memory, which thereby provides a fixed delay which is equal to one frame period. The input video signal Sb (shown in the waveform diagram of FIG. 5B) is applied to the "+" input terminals of each of the subtractors 3 and 4, while an output signal Sd produced from the feedback factor circuit 7 is applied to the "−" input terminal of the subtractor 4, to be subtracted from the input video signal Sb. An output signal Se (shown in the waveform diagram of FIG. 5E) is thereby obtained from the subtractor 4, and applied to the output terminal 2. The output signal Se is also inputted to the frame memory 8. An output signal Sa (shown in the waveform diagram of FIG. 5A) produced from the frame memory 8 is applied to the "−" input terminal of the subtractor 3, to be subtracted from the input video signal Sb, and thereby obtain a difference signal Sc (shown in the waveform diagram of FIG. 5C) from the subtractor 3. This difference signal Sc is inputted to the feedback factor circuit 7.

It will be assumed that the frame memory 8 can store one frame of the video signal. In that case, corresponding parts of two successive frames will be compared by the subtractor 3, to obtain the difference signal Sc, i.e. the instantaneous value of that signal represents a difference between two corresponding portions of the video signal which are separated along the time axis by one frame period. However the amplitude of the difference signal Sc can either be the result of noise contained in the input video signal Sb, or the result of dynamic variations in the video signal between successive frames. That is to say, the difference signal Sc will in general contain both of these respectively unwanted (i.e. noise) and wanted (i.e. actual signal variations) components.

The operation of the noise reducer circuit of FIG. 1 is based upon the assumption that any component of the difference signal Sc that results from noise contained in the input video signal Sb will be relatively small, while a component that results from actual dynamic signal variations in Sb (i.e. due to changes in the picture represented by the video signal, between successive frames) will be relatively large. For that reason, the circuit is configured such that when the absolute amplitude of the difference signal Sc is small, the feedback factor that is determined by the feedback factor circuit 7 will be large, while when the absolute amplitude of the difference signal Sc is large, the feedback factor will be made small.

FIGS. 3 and 4 respectively show two examples of input/output characteristics for the feedback factor circuit 7 which will achieve the above result.

However with the prior art circuit of FIG. 1, as is made clear by the waveform diagrams of FIGS. 5A to 5E, additional noise will be introduced into the output video signal as a result of large-amplitude changes in level of the input video signal. For example, when a large-amplitude step change occurs in the level of the input video signal as shown in FIG. 5A, then at the start of that change, a resultant step change in the level of the difference signal Sc (indicated by numeral 15 in FIG. 5C) will result in a step change in the amplitude of the feedback signal Sd (indicated by numeral 16 in FIG. 5D), and hence a corresponding spurious step change is introduced into the output video signal Se (indicated by numeral 17 in FIG. 5E). A similar phenomenon occurs as a result of each large-amplitude change of the input video signal in the opposite direction. Such a spurious amplitude change in the output video signal as that indicated by numeral 17 in FIG. 5E will result in interference in a resultant displayed video picture. For example, each vertical stripe of the desired picture will be accompanied by unwanted additional vertical stripes.

For that reason, the prior art circuit of FIG. 2 has been proposed to overcome the above disadvantage of the circuit of FIG. 1. This differs from the prior art circuit of FIG. 1 only in the addition of a high pass filter (HPF) 5 which is connected between the output of the subtractor 3 and the feedback factor circuit 7. Essentially, the circuit of FIG. 2 is based on the fact that relatively low-frequency components of the difference signal Sc will, statistically, represent actual dynamic components of the input video signal, rather than noise components. Relatively high-frequency components of the difference signal Sc on the other hand will generally consist of noise components. The output signal from the subtractor 3 is therefore passed through the HPF 5 before being supplied to the feedback factor circuit 7.

FIGS. 6A to 6E shows waveform diagrams of output signal Sa from the frame memory 8, the input video signal Sb, and output signals Sc, Sd and Se from the sb3, the feedback factor circuit 7, and the subtractor 4 of the prior art noise reducer circuit of FIG. 2. The basic operation of the circuit of FIG. 2 is essentially identical to that of FIG. 1, so that detailed description will be omitted. With the noise reducer circuit of FIG. 2, the high frequency components of the difference signal Sc from the subtractor 3 are extracted by the HPF 5 and supplied to the feedback factor circuit 7, i.e. as the noise component of the difference signal Sc.

The circuit of FIG. 2 suppresses low frequency components of the signal Sd that is produced from the feedback factor circuit 7. However as shown in FIG. 6D, a transient signal voltage occurs (e.g. as indicated by numeral 20 in FIG. 6D) in response to each edge of an abrupt large-amplitude change in the input video signal Sb, with each transient consisting of two successive relatively large-amplitude peaks of opposite polarity. As a result, corresponding transients (e.g. as indicated by numeral 22 in FIG. 6E) will be produced in the output video signal Se from the subtractor 4. Thus, noise interference will also be generated in a displayed picture obtained from the output video signal Se of the prior art noise reducer circuit of FIG. 2, i.e. interference that is generated as a result of operation of the noise reducer circuit itself.

SUMMARY OF THE INVENTION

It is an objective of the present invention to overcome the disadvantages of the prior art as set out above, by providing a video signal noise reducer circuit which effectively reduces noise in a video signal without significantly introducing additional noise components due to the operation of the noise reducer circuit itself.

To achieve the above objective, a noise reducer circuit according to the present invention includes means for subtracting from an input video signal a corresponding portion of an output video signal which has been delayed by a fixed time, with the resultant difference signal being passed through a high pass filter. Of the difference signal and the filtered difference signal, the signal currently having the smaller absolute value of amplitude is selected, and after being transferred through a feedback factor circuit is then subtracted from the input video signal to achieve noise reduction.

More specifically, a noise reducer circuit according to the present invention operates on an input video signal to obtain a corresponding output video signal in which noise components of said input video signal are substantially reduced, and comprises:
  means for delaying the output video signal by a fixed time delay to obtain a delayed output video signal;
  means for subtracting the delayed output video signal from the input video signal to obtain a difference signal;
  a high pass filter coupled to receive the difference signal, for producing a filter output signal;
  signal amplitude comparison and selection means for determining which of the difference signal and the filter output signal has a smaller value of amplitude, and for outputting a smaller value signal thus determined, as a selected signal; and
  means for subtracting the selected signal from the input video signal to obtain the output video signal.

BRIEF DESCRIPTION OF THE DRAWINGS

FIGS. 5A to 5E are waveform diagrams for describing the operation of the prior art noise reducer circuit of FIG. 1;

FIGS. 8A to 8F are waveform diagrams for describing the operation of the noise reducer circuit of FIG. 7.

DESCRIPTION OF PREFERRED EMBODIMENTS

Figure 1:
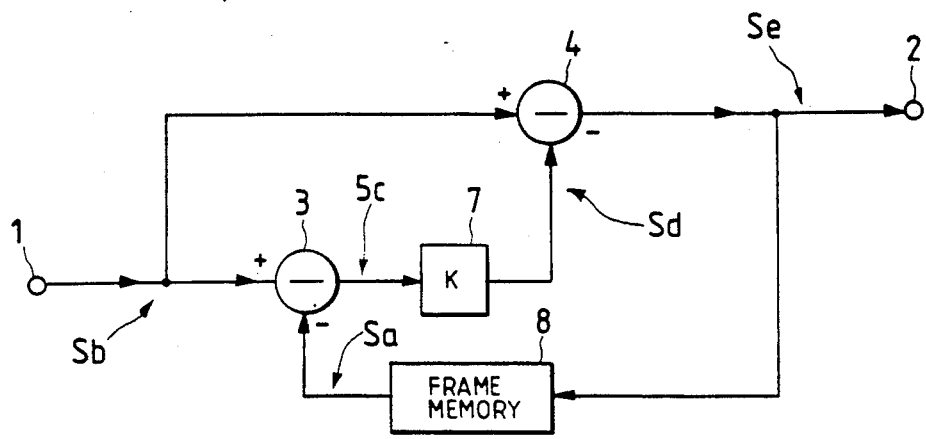
FIG. 1 is a block diagram of an example of a prior art feedback type of noise reducer circuit.
Figure 7:
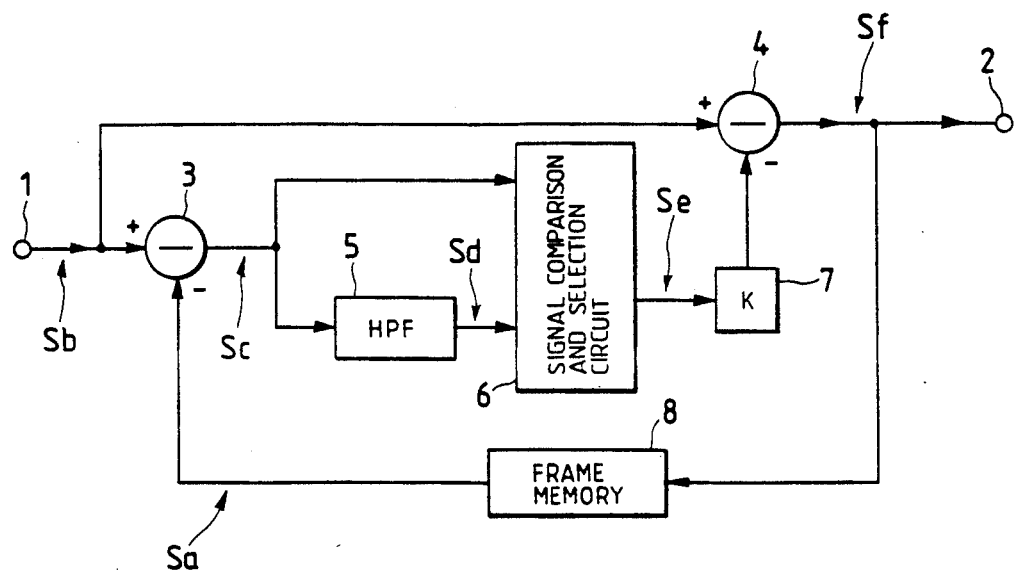
FIG. 7 is a block diagram of a first embodiment of a noise reducer circuit according to the present invention.

FIG. 7 is a general block diagram of a first embodiment of a noise reducer circuit according to the present invention, and FIGS. 8A to 8F are waveform diagrams for describing the operation of the circuit of FIG. 7. In FIG. 1, as for the prior art examples of an noise reducer circuit described above, an input video signal Sb is supplied to an input terminal 1 and from there to a "+" input of a subtractor 3. The circuit also includes a subtractor 4, a HPF 5, a feedback factor circuit 7, and a frame memory 8 which serves to produce an output signal that is delayed by a fixed time with respect to the input signal applied thereto. It will be assumed in the following that the frame memory 8 is a 1-frame memory, i.e. providing a fixed delay which is equal to one frame period of the input video signal Sb. Numeral 6 denotes a signal comparison and selection circuit, which compares the respective absolute values of instantaneous amplitude of two input signals supplied thereto, and selects the one of these signals having the smaller absolute value of amplitude, to be outputted therefrom as a selected signal Se. The signal Se is then applied to the feedback factor circuit 7, whose output signal is subtracted from the input video signal Sb in the subtractor 4, to obtain an output video signal Sf which is supplied to the output terminal 2. The output video signal Sf is inputted to the frame memory 8, i.e. to be outputted therefrom as signal Sa after a delay of one frame period, and subtracted from the input video signal in the subtractor 3. The resultant output signal Sc from the subtractor 3 is inputted to the signal comparison and selection circuit 6 and to the HPF 5, whose output is applied to the other input of the signal comparison and selection circuit 6. The signal comparison and selection circuit 6 thereby determines which of these two input signals applied thereto currently has the smaller absolute value of amplitude, and selects that smaller amplitude one of the output signals from the subtractor 3 and HPF 5 to be outputted therefrom as signal Se and supplied to the feedback factor circuit 7.

Figure 3:
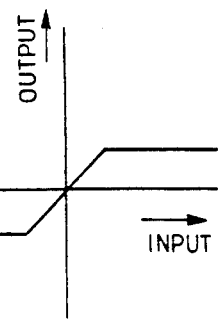
FIGS. 3 and 4 show examples of input/output characteristics for a feedback factor circuit.
Figure 4:
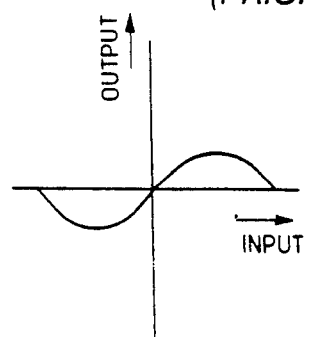

As for the prior art examples described above, the feedback factor circuit 7 has an input/output characteristic whereby a large value of feedback factor is established when the (absolute value of) signal Se is small, and a small value of feedback factor when the level of Se is large. Thus the feedback factor circuit 7 preferably has an input/output characteristic of the form shown in FIG. 3 or FIG. 4.

The circuit of FIG. 7 is a feedback type of noise reducer circuit, which need utilize only a single frame memory (or field memory) to subtract from a current frame of an input video signal the corresponding portions of an immediately preceding frame of that signal, and thereby obtain a feedback signal for use in noise reduction processing. As described above for the prior art examples, the output signal Sc from the subtractor 3 contains both noise components (in general, high frequency components) and low frequency components (in general, dynamic components of the actual video signal). The signal comparison and selection circuit 6 selects either this difference signal Sc, or a signal Sd obtained by removing the high frequency components of that signal Sc, to be outputted and used for noise reduction feedback, with the one of these signals Sc and Sd which currently has the smaller absolute value of amplitude being selected by the signal comparison and selection circuit 6.

Figure 2:
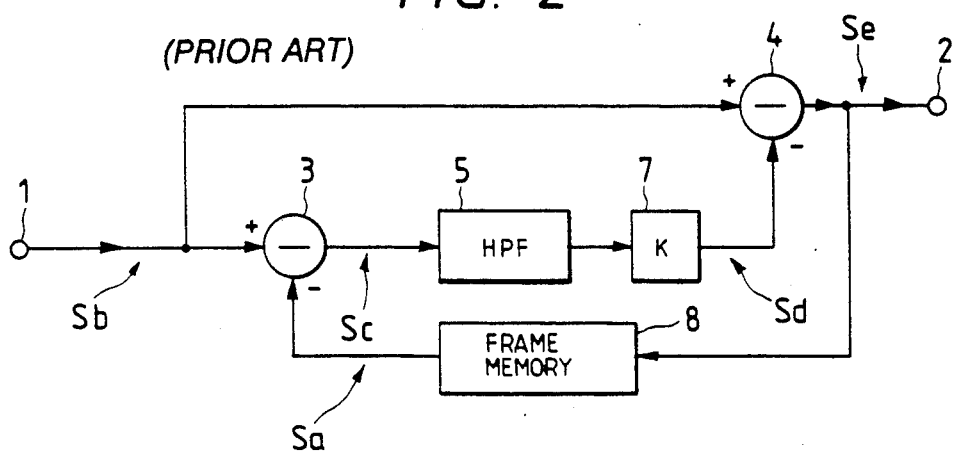
FIG. 2 is a block diagram of a second example of a prior art feedback type of noise reducer circuit.
Figures 6A, 6B, 6C, 6D, 6E:
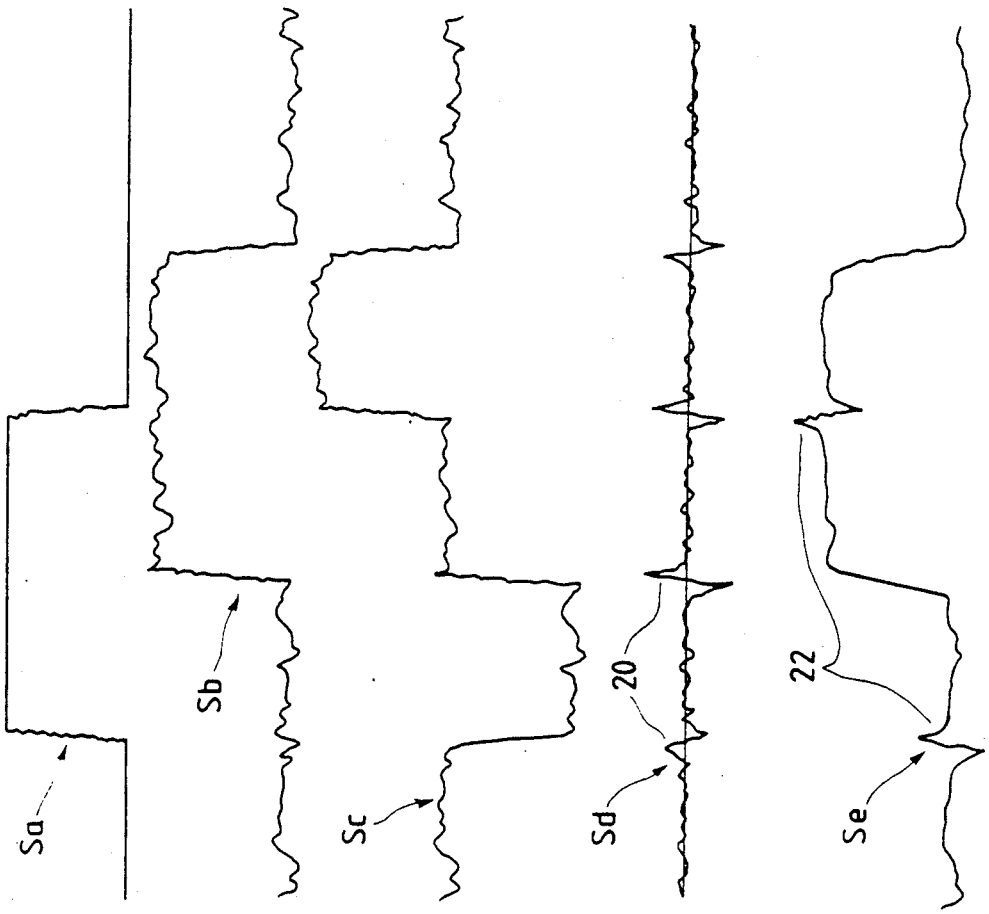
FIGS. 6A to 6E are waveform diagrams for describing the operation of the prior art noise reducer circuit of FIG. 2.

The embodiment of FIG. 7 provides a significant improvement in noise reduction performance by comparison with the prior art example of FIG. 2 described above. This can be understood by comparing the output signal waveform of FIG. 8F, for the circuit of FIG. 7, with the output signal waveform of FIG. 6E for the prior art circuit of FIG. 2.

As stated previously, the present invention is directed towards processing of a video signal which is of digital form. The noise reducer circuit embodiment of FIG. 7 utilizes a 1-dimensional type of digital filter, i.e. which operates on successive sets of digital sample values (e.g corresponding to successive picture elements) in each of successive (horizontal scanning) lines of the input video signal. There will be fixed amount of delay introduced between input and output of such a filter, so that in a practical circuit it will be necessary to include means for introducing a compensating amount of delay in the path between the output from the subtractor 3 and the (direct) input of the signal comparison and selection circuit 6, and in the path between the input terminal 1 and the "+" input of the subtractor 4. For simplicity of description, such delay means are omitted from the drawings.

Figure 9:
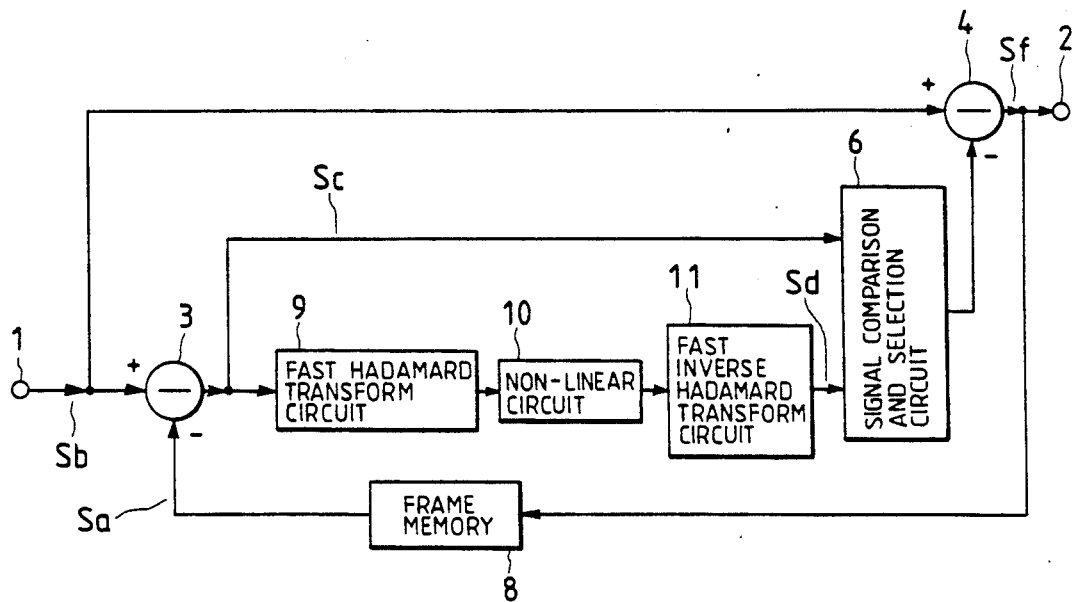
FIG. 9 is a block diagram of a second embodiment of a noise reducer circuit according to the present invention.

FIG. 9 is a block diagram of a second embodiment of a noise reducer circuit according to the present invention. This utilizes a 2-dimensional digital filter rather than a 1-dimensional filter, but otherwise the components and operation are identical to those of the embodiment of FIG. 7. There are various types of 2-dimensional filter circuit, however a circuit based on the Hadamard transform has the advantage of simplicity of configuration. Specifically, circuits for executing the fast Hadamard transform and inverse Hadamard transform can be configured by using only shift registers, adders and subtractors. Such circuits have been widely applied in the field of television technology, for operating on successive blocks of digital values (e.g. corresponding to blocks of picture elements) of a video signal, so that detailed description will be omitted. Each block consists of a fixed number of elements extending in the direction of a picture line, i.e. along an axis corresponding to the horizontal scanning direction, by an identical number of elements (scanning lines) extending in the vertical scanning direction.

In FIG. 9, numeral 9 denotes a circuit for executing the fast Hadamard transform, and 11 a circuit for executing the fast inverse Hadamard transform, operating on successive blocks of (picture element) data values of the output signal produced from the subtractor 3, while a non-linear circuit 10 operates on the output data values produced from circuit 9 such as to obtain a 2-dimensional high-pass filter frequency response characteristic for the combination of blocks 9, 10 and 11. In addition, the parameters of the non-linear circuit 10 are selected such that the combination of the fast Hadamard transform circuit 9, non-linear circuit 10 and fast inverse Hadamard transform circuit 11 also performs the function of the feedback factor circuit 7 of FIG. 7.

As in the case of the embodiment of FIG. 7, a fixed amount of delay will be introduced by the high pass 2-dimensional filter that is configured of the fast Hadamard transform circuit 9, the non-linear circuit 10 and the fast inverse Hadamard circuit 11, so that although not shown in the drawing, it will in practice be necessary to also include a delay unit in the line that connects the output of the subtractor 3 directly to an input of the signal comparison and selection circuit 6, and also between the input terminal 1 and the "+" input of the subtractor 4, in order to compensate for the delay produced in the 2-dimensional filter circuit.

Apart from the above, the operation of this embodiment is identical to the first embodiment described above, so that further description will be omitted.

It has been found that each of the noise reducer circuit embodiments of the present invention described above provides a significant improvement over prior art circuits of the type shown in FIGS. 1 and 2, by substantially suppressing the introduction of extraneous lines or stripes (resulting from operation of the noise reducer circuit itself) into a displayed picture that is obtained from the output video signal of the noise reducer circuit. Furthermore if a 2-dimensional filter is utilized, a simple circuit configuration for the filter can be achieved by using the fast Hadamard transform, although the invention is not limited to the use of such a type of 2-dimensional filter.

What is claimed is:

1. A noise reducer circuit for operating on an input video signal (Sb) to obtain a corresponding output video signal (Sf) in which noise components of the input video signal are substantially reduced, comprising:
   means for delaying the output video signal by a fixed time delay to obtain a delayed output video signal (Sa);
   means for subtracting the delayed output video signal (Sa) from the input video signal (Sb) to obtain a difference signal (Sc);
   a high pass filter coupled to receive the difference signal (Sc), for producing a filter output signal (Sd);
   signal amplitude comparison and selection means for determining which of the difference signal (Sc) and the filter output signal (Sd) has a smaller absolute value of amplitude, and for outputting a smaller value signal thus determined, as a selected signal (Se); and means for subtracting the selected signal (Se) from the input video signal (Sb) to obtain the output video signal (Sf).

2. A noise reducer circuit according to claim 1, in which the high pass filter is a 1-dimensional digital filter.

3. A noise reducer circuit according to claim 1, in which the high pass filter is a 2-dimensional digital filter.

4. A noise reducer circuit according to claim 3, in which the 2-dimensional digital filter is configured as a combination of a fast Hadamard transform circuit which is coupled to receive the difference signal (Sc), non-linear circuit means for receiving an output signal produced from the fast Hadamard transform circuit, and a fast inverse Hadamard transform circuit for receiving an output signal produced from the non-linear circuit means and for producing the filter output signal (Sd).

5. A noise reducer circuit according to claim 1, and further comprising feedback factor means for modifying the amplitude of the selected signal (Se) by a feedback factor before subtracting the selected signal (Se) from the input video signal (Sb), in which a value of the feedback factor is determined in accordance with an instantaneous value of amplitude of the selected signal (Se).

* * * * *